United States Patent [19]

Fujioka

[11] 4,185,308

[45] Jan. 22, 1980

[54] ENCLOSED-TYPE MAGNETIC DISC RECORDING AND/OR REPRODUCING APPARATUS

[75] Inventor: Masahiko Fujioka, Hamura, Japan

[73] Assignee: Tokyo Shibaura Electric Co., Ltd., Kawasaki, Japan

[21] Appl. No.: 835,060

[22] Filed: Sep. 21, 1977

[30] Foreign Application Priority Data

Sep. 24, 1976 [JP] Japan .................. 51-114436

[51] Int. Cl.² .................................... G11B 17/00
[52] U.S. Cl. ........................... 360/97; 360/133
[58] Field of Search .................. 360/97, 98–99, 360/133, 78

[56] References Cited

U.S. PATENT DOCUMENTS

| | | | |
|---|---|---|---|
| 3,710,357 | 1/1973 | Buslik | 360/97 |
| 3,740,735 | 6/1973 | Gabor | 360/97 |
| 3,825,951 | 7/1974 | Katsumori et al. | 360/98 |
| 3,843,967 | 10/1974 | Mulvany | 360/98 |
| 3,849,800 | 11/1974 | Cuzner et al. | 360/97 |
| 3,902,195 | 8/1975 | Osako et al. | 360/133 |
| 3,938,192 | 2/1976 | Caletti | 360/133 |
| 4,054,931 | 10/1977 | Bolton et al. | 360/97 |
| 4,062,049 | 12/1977 | Dirks | 360/133 X |

*Primary Examiner*—John H. Wolfe
*Attorney, Agent, or Firm*—Oblon, Fisher, Spivak, McClelland & Maier

[57] ABSTRACT

An enclosed-type magnetic disc recording and/or reproducing apparatus according to this invention, having a pressure chamber to enclose a bearing unit of a flange rotating along with a magnetic disc, introduces an air pressure at a high-pressure portion, created by an air flow produced by rotation of the magnetic disc and the flange, into the pressure chamber so as to raise the pressure within the pressure chamber to a level higher than 1 atm., thereby preventing the lubricant evaporated from the bearing member from sticking to the magnetic disc or head to lower the faculty thereof.

4 Claims, 4 Drawing Figures

ENCLOSED-TYPE MAGNETIC DISC RECORDING AND/OR REPRODUCING APPARATUS

BACKGROUND OF THE INVENTION

This invention relates to an enclosed-type magnetic disc recording and/or reproducing apparatus capable of preventing the lubricant from being introduced from bearing unit into the enclosed chamber by rotation of the magnetic disc and the flange driven within the enclosed chamber.

Generally, in magnetic disc recording and/or reproducing apparatuses, the magnetic head at operation usually operates while floating with a prescribed width of gap left between such head and the surface of the magnetic disc by existence of a substantially fixed thickness of thin air flow produced over the magnetic disc.

If lubricants, such as oil and grease, or other foreign matters stick to the magnetic disc and the magnetic head, the width of the aforesaid gap will become smaller than the prescribed level and, in an extreme case, the rotation of the magnetic disc will be retarded, causing the performance of the apparatus to be reduced. Though there had conventionally been proposed supply of clean air to the periphery of the magnetic head in order to avoid the above unfavorable state of things, it could not lead to a satisfactory result. The reason for this is that when the magnetic disc rotates, the air within the magnetic disc cover (hereinafter referred to as disc cover) covering the magnetic disc is subjected to a flow, thereby causing differences of air pressure with locations within the disc cover. Additionally, the pressure between the flange, fixed to the tip end of a shaft supported by the bearing unit provided at a base of the apparatus and fitted with the magnetic disc, and the base becomes lower than the atmospheric pressure, thereby vaporizing the lubricant, such as oil or grease, applied to the bearing member and causing it to be sucked into the disc cover. Thus, the vaporized lubricant spreads in all directions within the disc cover following the aforesai air flow, sticking to the magnetic head, magnetic disc, and all other portions within the disc cover. Consequently, the life of the magnetic head and disc, as well as the capability of recording and/or reproducing data for the magnetic disc, may be reduced to cause malfunction.

SUMMARY OF THE INVENTION

An object of this invention to provide an enclosed-type magnetic disc recording and/or reproducing apparatus capable of preventing the lubricant from penetrating into the inside of the disc cover through the bearing unit accompanying rotation of the magnetic disc.

In order to attain this object, the enclosed-type magnetic disc recording and/or reproducing apparatus of the invention is provided with a base; a disc cover to define an enclosed chamber along with the base; a bearing unit having one side protruding into the enclosed chamber from the base and the other side exposed to the open air; a shaft borne by the bearing unit and having its tip end protruding into the enclosed chamber; a flange attached to the tip end of the shaft, fitted with a magnetic disc so as to be rotated integrally therewith, and defining along with the base a pressure chamber around the bearing unit; and a pressure-rise means for raising the air pressure within the pressure chamber to a level above the atmospheric pressure.

According to such apparatus, the one side of the bearing unit facing to the enclosed chamber is subjected to a pressure in the pressure chamber higher than the atmospheric pressure, while the other side of the bearing unit, opening into the open air, is kept at the atmospheric pressure. Thus, the lubricant used for the bearing unit will never be sucked in by the enclosed chamber, and hence there will be provided no possibility of reduction in performance of the apparatus due to the lubricant's defiling the magnetic disc or head.

In a preferred embodiment of this invention, the pressure chamber is defined by a first cylindrical projecting member projecting from the base so as to surround the bearing unit and a second cylindrical projecting member projecting from the flange so as to surround the bearing unit and capable of rotating relatively to the first projecting member with a suitable length of portions of both members overlapping each other with a narrow space left between such portions.

A first preferred embodiment of the pressure-rise means are openings or air inlets bored in the flange so as to connect the pressure chamber with a high-pressure portion formed above the center of rotation of the flange by rotation of the flange and the magnetic disc. Though this structure may not allow so much higher pressure within the pressure chamber as compared with the atmosphere, it is characterized by its simplicity and wide range of applications.

Meanwhile, a second preferred embodiment of the pressure-rise means, including a plurality of moving blades disposed on a side of the flange facing to the base, is so constructed that an air at the lower portion of the enclosed chamber is shifted toward the upper central portion of the flange by rotation of the moving blades, thereby introducing a relatively high pressure yielded at such upper central portion into the pressure chamber through the air inlets. According to this structure, the pressure within the pressure chamber may be further increased as compared with the case employing the air inlets alone owing to the action of the moving blades.

In a third preferred embodiment of the pressure-rise means, in the base is bored a high-pressure air inlet to connect the pressure chamber with the outside, and a compressed air delivered from an externally disposed pressure supply system, such as compressor, is introduced into such inlet through a filter and a pressure regulator. In this case, the pressure within the pressure chamber may be adjusted properly, high or low, so that we can select the optimum pressure within the pressure chamber for operation of the apparatus.

Further, in a fourth preferred embodiment of the pressure-rise means, a spiral groove is formed on the aforesaid portion of the second projecting member facing to the edge of the first projecting member, that is, on the rotatively facing surface of such overlapping portion, the spiral being so cut that the relatively low-pressure air outside the pressure chamber may be introduced into the pressure chamber by action of the spiral groove. According to this structure, although the pressure within the pressure chamber will not become very much higher than 1 atm., there may be obtained a means for preventing the lubricant from penetrating into the chamber. The efficiency of the pressure chamber may be increased with the pressure within the pressure chamber as a whole suitably raised by combining this method with other various methods as described above.

DETAILED DESCRIPTION OF THE PREFERRED EMBODIMENTS

Figure 1:
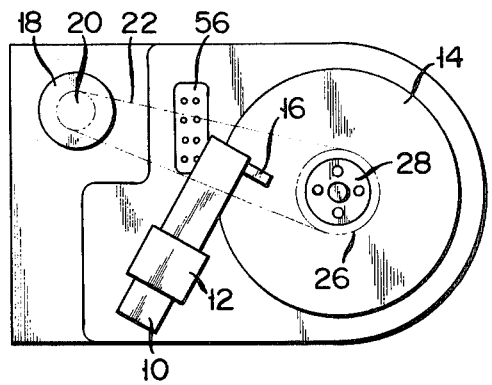
FIG. 1 is a plan view of the magnetic disc recording and/or reproducing apparatus of this invention cleared of the cover.

Referring now to FIG. 1, numeral 10 denotes a driving actuator driven by a control section (not shown), and a head arm 12 is integrally attached to such driving actuator 10. At the tip end portion of the head arm 12 is installed a magnetic head 16 for recording and/or reproducing data signals for a magnetic disc 14. The magnetic head 16 is shifted over the magnetic disc 14 by operation of the driving actuator 10, and a data signal is recorded and/or reproduced at an optional position on the magnetic disc 14 by such movement of the magnetic head 16 combined with rotation of the disc 14. Numeral 18 denotes a driving motor to rotate the magnetic disc 14. The magnetic disc 14 may be rotated by turning a pulley 26 attached to a shaft 24 (FIG. 2) through a pulley 20 attached to the motor 18 and a belt 22. The magnetic disc 14 is doughnut-shaped, and a flange 28 is inserted in and firmly attached to the inner periphery of the disc 14.

Figure 2:
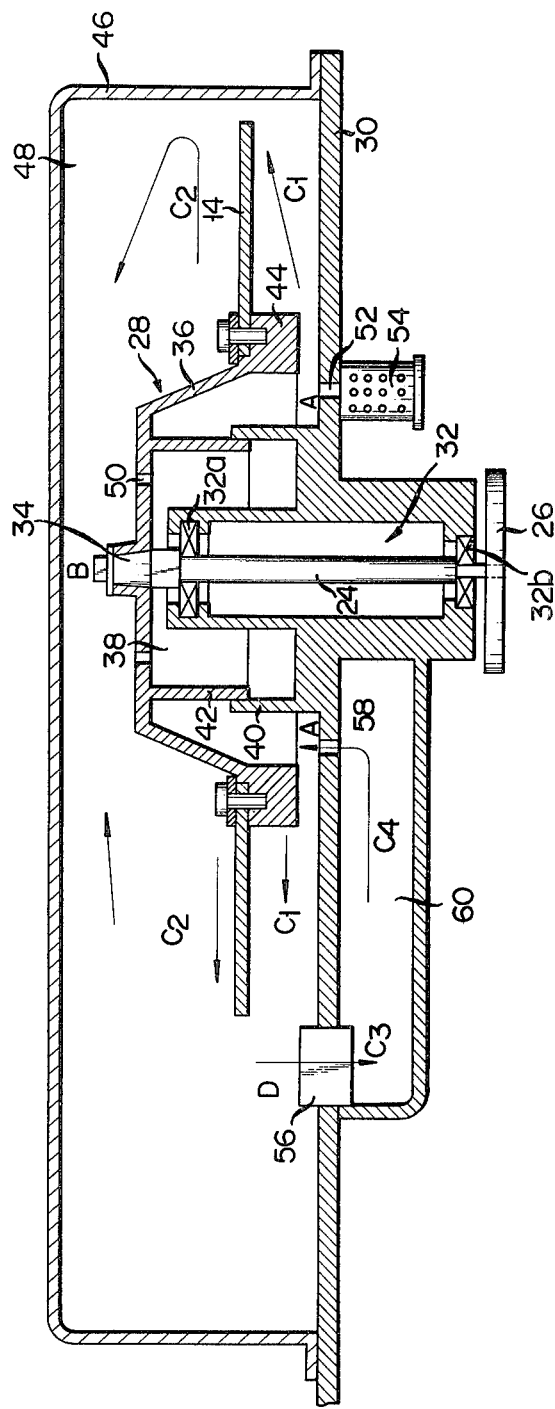
FIG. 2 is a sectional view of the apparatus of FIG. 1.

As shown in FIG. 2, on a base 30 is mounted a bearing unit 32 to hold the shaft 24 at a right angle to the base 30, and the shaft 24 is supported by ball bearings 32a and 32b included in the bearing unit 32. The top end of the shaft 24 extends upward from the bearing unit 32, while a conical portion 34 at the tip of the shaft 24 is fitted firmly with the flange 28. The flange 28 has a bowl-shaped protrusion projecting upward from the outer periphery thereof, and the magnetic disc 14 is fixed to the periphery of such projection 36. Further, the pulley 26 is attached to the bottom end of the shaft 24.

In a space formed between the bowl-shaped protrusion 36 of the flange 28 and the base 30 is provided a pressure chamber 38. The pressure chamber 38 is defined by a first cylindrical projecting wall 40 projecting upward from the base 30 and so formed as to surround the bearing unit 32; a second projecting wall 42 projecting downward from the flange 28 and so formed as to surround the bearing unit 32 and rotate smoothly relatively to the first wall 40, a suitable length of portions of both walls overlapping each other with a narrow gap left between such portions the flange 28; and the base 30. Along the skirt of the bowl-shaped protrusion 36 of the flange 28 are arranged a plurality of moving blades 44 extending toward the base 30.

The magnetic disc 14, flange 28, driving actuator 10, head arm 12, and magnetic head 16 are contained within an enclosed chamber 48 formed between a cover 46 attached to the base 30 and such base 30.

In the flange 28 is bored a plurality of air inlets 50 to connect the pressure chamber 38 with a high-pressure portion in the airtight chamber 48 located above the pressure chamber 38. Further, in a portion of the base 30 outside the pressure chamber 38 is bored an opening 52 through which the enclosed chamber 48 opens into the air. A filter 54 attached to the base 30 may be used for cleaning the open air when such air flows into the enclosed chamber 48 through the opening 52. On the side of the base 30 opposite to the enclosed chamber 48 is disposed a channel 60 to connect a higher-pressure portion in the vicinity of the outer periphery of the magnetic disc 14 with a lower-pressure portion at the outer periphery of the pressure chamber 38 through a filter 56 and a circulating air inlet 58.

Referring now to FIGS. 1 and 2, there will be described the operation of the embodiment of FIG. 2. When the shaft 24 rotates accompanying the rotation of the driving motor 18, the rotating members, that is, the flange 28 and magnetic disc 14 is rotated to shift the air at portion A of the enclosed chamber 48, lying between the base and the rotating member and outside the pressure chamber 38, in the direction of the outer periphery through the space between the base 30 and the rotating member. Further, such air, together with air driven to the outer periphery of the magnetic disc 14 also accompanying the rotation of the disc 14, is forced up above the magnetic disc 14 along the cover 46 and shifted substantially in the directions of arrows C1 and C2, respectively, toward portion B above the protrusion 36 of the flange 28. Accordingly, though the air pressure at portion A has an inclination to decrease, it is kept substantially at the atmospheric pressure because said portion A communicates with the open air by means of the fresh-air inlet 52 and filter 54, while the air pressure at portion B is raised to a level above the atmospheric pressure. The moving blades 44 attached to the flange 28 are used for intensifying the air flow along a series of arrows C1 and thereby increasing the pressure at portion B. However, the aforesaid pressure rise effect can be produced by the rotation of the flange 28 and magnetic disc 14 only, so that the moving blades 44 may be omitted unless its assistance is expressly needed in view of the structure of the apparatus.

The high-pressure brought out at portion B is introduced into the pressure chamber 38 through the air inlets 50, while the air pressure within the pressure chamber 38 is raised to a level higher than the atmospheric pressure. On the other hand, the bearing unit 32 is provided with ball bearings or other suitable bearings 32a and 32b at both end portions respectively, and a lubricant, such as oil or grease, is applied to the bearings. As in the cases of the prior art apparatuses, if there is provided no pressure chamber 38 and the bearing member is surrounded directly by a low-pressure portion corresponding to portion A as shown in FIG. 2 where the pressure is lower than the atmospheric pressure, the lubricant will be sucked out and vaporized by such low-pressure portion to spread out within the enclosed chamber 48. According to this invention, however, around the bearing unit 32 especially around the upper ball bearing 32a is formed the pressure chamber 38 in which the pressure is higher than the atmospheric pressure, so that the lubricant will be neither sucked out from the bearing unit 32 nor introduced into the pressure chamber 38. The reason is that one side or the upper portion of the bearing unit 32 is subjected to the high pressure within the pressure chamber 38, while the other side is exposed to the open air, that is, the atmospheric pressure. Since the first and second projecting walls rotates relatively, overlapping each other with a narrow gap left between them, the air within the pressure may gradually flow out through such overlapping portion. However, if the gap at the overlapping portion is narrowed, or the overlapping portion itself is increased in length or so formed as to create the effect of maze, the outflow of the air from the pressure chamber 38 through such portion may be reduced, thus avoiding mulfunction of the pressure chamber 38.

The channel 60 connects portion D outside the outer periphery of the magnetic disc 14 where the air pressure is raised to some degree with portion A where the pressure is lower as compared with portion D. Accordingly, the air within the enclosed chamber 48 is passed through the filter 56 from the portion D in the direction of arrow C3 to be cleaned, and then sucked in again within the direction of arrow C4 within the enclosed chamber 48 through the channel 60 and the circulating air inlet 58. Thus, the air within the enclosed chamber 48 is continually cleaned by passing through the aforesaid route while in operation.

As may be clear from the above description, according to the invention, the pressure within the pressure chamber, provided around the bearing unit 32, is kept at a level higher than the atmospheric pressure taking advantage of the air flow accompanying the rotation of the flange 28 and the magnetic disc 14, and such pressure is applied to one side of the bearing unit 32 facing to the pressure chamber 38, while the atmospheric pressure is applied to the other side, thereby entirely preventing the lubricant for the bearing unit 32 from spreading within the enclosed chamber to deteriorate the faculties of the magnetic disc 14 as well as of the magnetic head 16.

Figure 3:
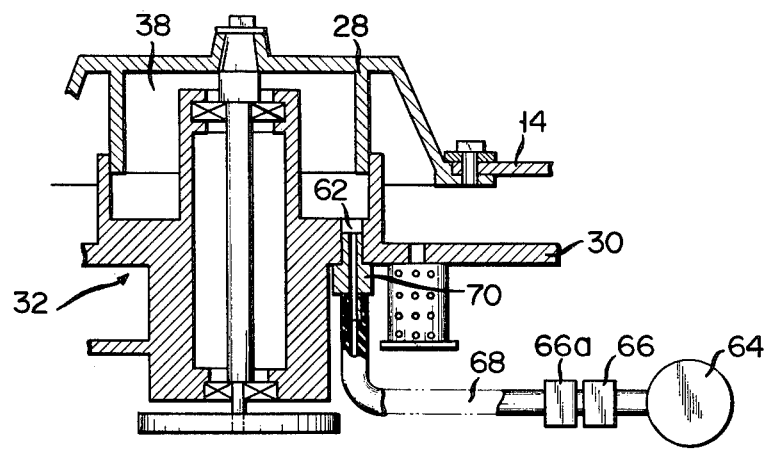
FIGS. 3 and 4 are partial sectional views of alternative embodiments of the apparatus of FIG. 2 modified as regards the pressure-rise means.

The apparatus as shown in FIG. 3, preponderantly illustrating the portions varying from the corresponding ones in FIG. 2, is provided with a system to supply the pressure chamber with a suitable air pressure higher than the atmospheric pressure from the outside as a means for raising the pressure within the pressure chamber 38 of the apparatus of FIG. 2. In this embodiment, there are not used such moving blades 44 and air inlets 50 as used with the apparatus of FIG. 2, but the base is provided with a high-pressure air inlet 62 to connect the pressure chamber 38 with the open air. To such inlet 62 is connected a pressure supply system. This pressure supply system is provided with a compressed air source including, e.g., a compressor 64, a filter 66, and a pressure regulator 66a, as well as with piping members, such as a conduit 68 and a socket 70. The compressed air delivered from the compressor 64 is cleaned and converted into a suitable pressure, and then supplied to the pressure chamber 38 through the high-pressure inlet 62. The advantage obtained from the pressure chamber 38 at this time is the same as that in the case of FIG. 2.

Figure 4:
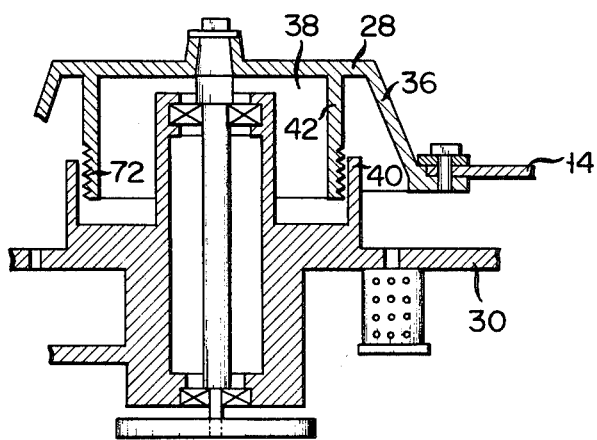

FIG. 4 shows a case in which the apparatus according to the embodiment as shown in FIG. 2 is provided with a spiral groove 72 formed on the second projecting wall 42 for raising the pressure within the pressure chamber 38. This groove 72 may be a regular, square, or trapezoidal thread. In any case, it is necessary only that the air existing between the outer periphery of the protrusion 36 of the flange 28 and the second projecting wall 42 be introduced into the pressure chamber 38 through the space between the first and second projection walls by action of the spiral groove 72 rotating with the flange 28, and there be formed an air flow to raise the pressure within the pressure chamber 38. That is, if the flange 28 rotates clockwise as viewed from above, the spiral groove 72 is formed left-handed; if counterclockwise, then right-handed. Also in this case, like the case of the embodiment of FIG. 3, the air inlets 50 and the moving blades 44 are omitted. Such types of threads as described above may be used when the second projecting wall 42 is located inside the first projecting wall 40 as shown in FIG. 4. If the second projecting wall 42 is located outside the first projecting wall 40, then the groove 72 should be on the inner surface of the second projecting wall 42 and be so cut that the air existing outside both walls 40 and 42 may reach the pressure chamber through the gap between both such walls. Thus, the thread-cutting direction is opposite to that in the case of FIG. 4.

Although there have been described, as the means for raising the air pressure within the pressure chamber 38, (1) the air inlets 50, (2) the air inlets 50 combined with the moving blades 44, (3) the pressure supply system for supplying a high-pressure air used in place of the air inlets 50 and/or the moving blades, and (4) the spiral groove 72 formed on the second projecting wall 42 used in place of the air inlets 50 and/or the moving blades, they are no more than typical examples. Since the pressure within the pressure chamber would never be raised above the atmospheric pressure depending on apparatuses, the aforesaid means could be combined suitably to obtain the pressure within the pressure chamber higher than the atmospheric pressure.

In the embodiment as shown in FIG. 3, the pressure within the pressure chamber 38 may be freely adjusted by operating the pressure regulator 66, so that you can select the optimum pressure for the chamber pressure.

Further, the embodiment as shown in FIG. 4 is characterized by that it requires no special members other than the spiral groove 72 formed on the second projecting wall 42, and is easily added to help other pressure-rise means.

What is claimed is:

1. An enclosed-type magnetic disc recording and/or reproducing apparatus comprising:

a base, a disc cover to define an enclosed chamber between said cover and said base, a bearing unit having two ends, one end protruding into said enclosed chamber from said base and the other end exposed to open air at atmospheric pressure, a shaft borne by said bearing unit and having a tip end protruding into said enclosed chamber, a flange attached to the tip end of said shaft, fitted with a magnetic disc so as to be rotated integrally therewith, and defining along with said base a separate pressure chamber within said enclosed chamber to surround said bearing unit and isolate said bearing unit from said enclosed chamber, a spiral groove for raising the air pressure within said pressure chamber to a level above that in the enclosed chamber, and means for rotating said shaft, said flange attached to the tip end of said shaft, and said magnetic disc, said pressure chamber within the enclosed chamber having a first cylindrical projecting member projecting toward the flange from the base so as to surround the bearing member and a second cylindrical projecting member projecting toward the base from the flange so as to surround the bearing member and rotate relatively to the first projecting member with a suitable length of the free end portions of both projecting members overlapping each other with a space left between said portions, both cylindrical projecting members being concentric with the shaft and having inner diameters larger than the diameter of the bearing unit, whereby said pressure chamber is formed between the projecting members, the base and the bearing unit; and said spiral groove being formed on the overlapping portion of the second projecting member facing the first projecting member to force air through the space left between the overlapping portions of the first and second cylindrical projecting members by introducing low-pressure air which surrounds said pressure chamber into the pressure chamber by relative rotation between the projecting members as produced by rotation of the shaft.

2. An enclosed-type magnetic disc according and/or reproducing apparatus according to claim 1, wherein said base comprises:
 an open air inlet to connect said enclosed chamber in a space defined between said flange and said base and outside said pressure chamber with open air under atmospheric pressure.

3. An enclosed-type magnetic disc recording and/or reproducing apparatus according to claim 2, wherein said open air inlet is fitted with a filter for cleaning an open air flowing into said enclosed chamber.

4. An enclosed-type magnetic disc recording and/or reproducing apparatus according to claim 1, wherein said base is provided with a channel to connect a first space within said enclosed chamber near the outer periphery thereof with a second space outside and in the vicinity of said bearing member, said channel being provided with a filter, so that air within said first space is passed through said channel for cleaning and then delivered again to said second space within said enclosed chamber.

* * * * *